United States Patent
Bilal et al.

(10) Patent No.: US 9,137,637 B2
(45) Date of Patent: Sep. 15, 2015

(54) PRINTED TAG REAL-TIME TRACKING

(71) Applicant: King Abdullah University of Science and Technology (KAUST), Thuwal (SA)

(72) Inventors: Rana M. Bilal, Thuwal (SA);
Muhammad F. Farooqui, Thuwal (SA);
Hammad M. Cheema, Thuwal (SA);
Atif Shamim, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 19 days.

(21) Appl. No.: 13/799,272

(22) Filed: Mar. 13, 2013

(65) Prior Publication Data

US 2014/0274139 A1 Sep. 18, 2014

(51) Int. Cl.
| | |
|---|---|
| H04W 24/00 | (2009.01) |
| H04W 4/02 | (2009.01) |
| G01S 19/48 | (2010.01) |
| G01S 5/00 | (2006.01) |

(52) U.S. Cl.
CPC ............. *H04W 4/025* (2013.01); *G01S 5/0027* (2013.01); *G01S 19/48* (2013.01)

(58) Field of Classification Search
CPC ....... H04W 4/02; H04W 4/008; H04W 64/00; H04W 64/003
USPC .......... 455/456.1, 456.2, 456.3, 556.1, 575.1, 455/90.2, 90.3
See application file for complete search history.

(56) References Cited

U.S. PATENT DOCUMENTS

| | | | |
|---|---|---|---|
| 6,181,281 B1 * | 1/2001 | Desclos et al. | 343/700 MS |
| 6,459,989 B1 | 10/2002 | Kirkpatrick | |
| 2004/0192352 A1 | 9/2004 | Vallstrom | |
| 2008/0121690 A1 | 5/2008 | Carani | |
| 2009/0002188 A1 | 1/2009 | Greenberg | |
| 2010/0148859 A1 * | 6/2010 | Cleeves et al. | 327/564 |
| 2010/0328063 A1 * | 12/2010 | Derrick et al. | 340/539.13 |
| 2012/0115506 A1 * | 5/2012 | Bentley | 455/456.1 |
| 2013/0214986 A1 * | 8/2013 | Zhu et al. | 343/848 |

OTHER PUBLICATIONS

International Search Report and Written Opinion of Application No. PCT/IB2014/001070 dated Dec. 22, 2014, 16 pages.

* cited by examiner

*Primary Examiner* — Temica M Beamer
(74) *Attorney, Agent, or Firm* — Thomas|Horstemeyer, LLP (57) ABSTRACT

Disclosed are various embodiments for monitoring tracking devices capable of seamless indoor and outdoor tracking transitions. A tracking device may comprise, for example, printable circuitry and antennas combined with one or more receivers/transceivers on a substrate. The tracking device may be configured, for example, to localize the tracking device via GPS or an alternative localization strategy based on a determination of whether GPS communication is available. A modified RSSI fingerprinting methodology may be used to accurately determine a location of the tracking device using Wi-Fi access points. A device monitoring service may communicate with internal and/or external mapping API's to render a device monitoring user interface comprising a visual representation of the location of the tracking device.

22 Claims, 7 Drawing Sheets

PRINTED TAG REAL-TIME TRACKING

BACKGROUND

Tracking devices are used today to monitor the location of people or things in real-time. Yet, tracking devices remain relatively costly, add notable weight to devices in which they are implemented, and/or take up valuable space in devices in which they are implemented. Interfacing with user-friendly frameworks for the provision of tracking device locations to an end-user remains burdensome. Moreover, integrated traceability in indoor as well as outdoor situations remains problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing an end-to-end system for providing and/or monitoring tracking devices as well as a tracking device for use in the system. As may be appreciated, tracking devices are used today to monitor the location of people or things in real-time. Yet, tracking devices remain relatively costly, add notable weight to devices in which they are implemented, and/or take up valuable space in devices in which they are implemented. For example, tracking devices may require circuitry that is bulky or burdensome. Damage to the tracking devices requires replacement of the tracking devices which may present an undue expense. Typically, infrastructure capable of interacting with tracking devices require expensive infrastructure placement at relatively proximate intervals. For example, radio-frequency identification (RFID) tracking devices require RFID readers every so many feet. Further, provision of a user-friendly monitoring interface capable of seamless traceability in outdoor as well as indoor environments remains problematic.

For example, by utilizing printable circuitry the cost of constructing a tracking device may be drastically reduced. Low cost fabrication methods may be used for the tracking devices such as reel-to-reel or roll-to-roll printing. In addition, environment friendly materials may be used.

Moreover, implementing one or more forms of localization and/or communication may utilize existing infrastructure (e.g., global positioning system (GPS), wireless access points, Bluetooth devices, etc.) while providing redundancy and reliability. Implementing one or more forms of localization and/or communication can also provide tracking across different environments, such as indoor and outdoor environments. In the following discussion, a general description of the system and its components is provided, followed by a discussion of the operation of the same.

Figure 1A:
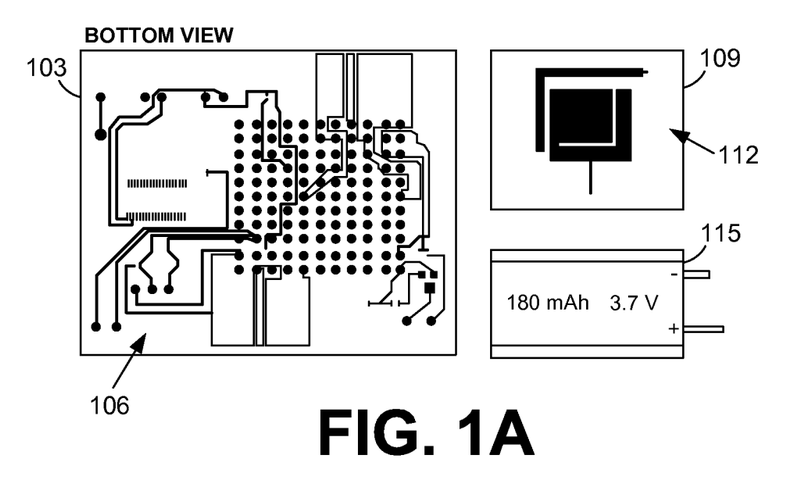
FIGS. 1A-B are drawings of individual components that may be employed in creating a tracking device.

With reference to FIG. 1A, shown are the components of an exemplary tracking device for use in the present system. The tracking device may be printed using, for example, an inkjet printer. In the non-limiting example of FIG. 1A, a printed tracking device may comprise a circuit 103 printed on a substrate 106, one or more antennas 109 printed on a substrate 112, and a battery 115. A substrate 106 for circuitry and/or a substrate 112 for antennas 109 may comprise, for example, paper, plastic, Silicon, polymer, or other material. As may be appreciated, a circuit and/or antenna may be printed using relatively inexpensive inkjet and/or screen printing technology. For example, an inkjet printer may utilize conductive ink to print a complete and/or partial circuit on a substrate, the circuit capable of being combined with additional circuitry. Conductive ink may comprise, for example, ink comprising conductive nanoparticles, nanotubes, and/or other conductive materials such as gold, silver, copper, silicon, and/or any combination thereof. As may be appreciated, various paper and/or plastic substrates may be used to flex and/or bend without damaging the circuit, and may be selected to be environmentally friendly. In the case of an inkjet printer, the thickness of the substrate may be selected for use in the printer.

In order to power a lightweight, flexible, and minimal tracking device, a battery 115 may comprise, for example, a flexible battery. A flexible battery, for example, may be capable of being folded or bended without compromising the integrity of the battery. Such batteries may be printed using nanotube ink or may be commercially available (e.g., flexible lithium-ion, flexible nickel-cadmium batteries, etc.). When combined with flexible circuitry, the combination of the circuitry 103 and the battery 115 may also be capable of being folded or bended without compromising the integrity of a tracking device. Alternatively, a tracking device may comprise any other power source in lieu of a battery 115. Additionally, a battery 115 may be combined with various recharging circuitry (not shown). Recharging circuitry, for example, may comprise a solar panel, perpetual motion recharging circuitry, and/or other recharging circuitry.

Figure 1B:
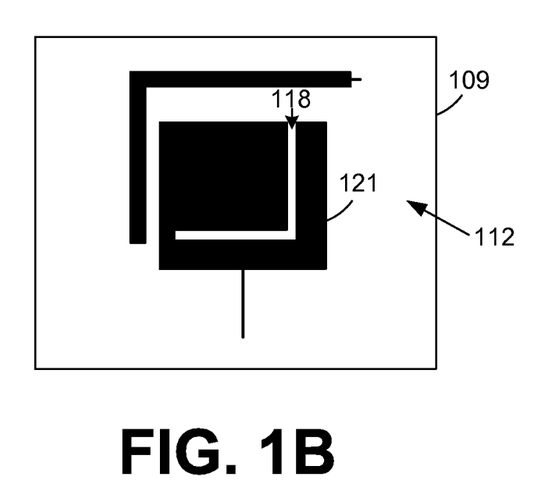

With reference to FIG. 1B, shown is an exemplary antenna 109 of FIG. 1A that may be deployed in a tracking device. As discussed above with respect to FIG. 1A, an antenna 109 may be created by printing the antenna 109 using an inkjet printer, screen printing, and/or any like method. Moreover, the antenna 109 may be printed on a substrate 112 that may comprise, for example, paper, plastic, Silicon, and/or any other material also as discussed above. The antenna 109 may be printed to be right-hand circularly polarized (CP). CP may be achieved by exciting two orthogonal field components with equal magnitude and a 90 degree phase difference. In the non-limiting example of FIG. 1B, the two orthogonal field components are excited via asymmetry or a perturbation in the antenna structure. For example, an L-shaped absence 118 is introduced in the rectangular monopole structure 121 to achieve circular polarization.

Figure 2:
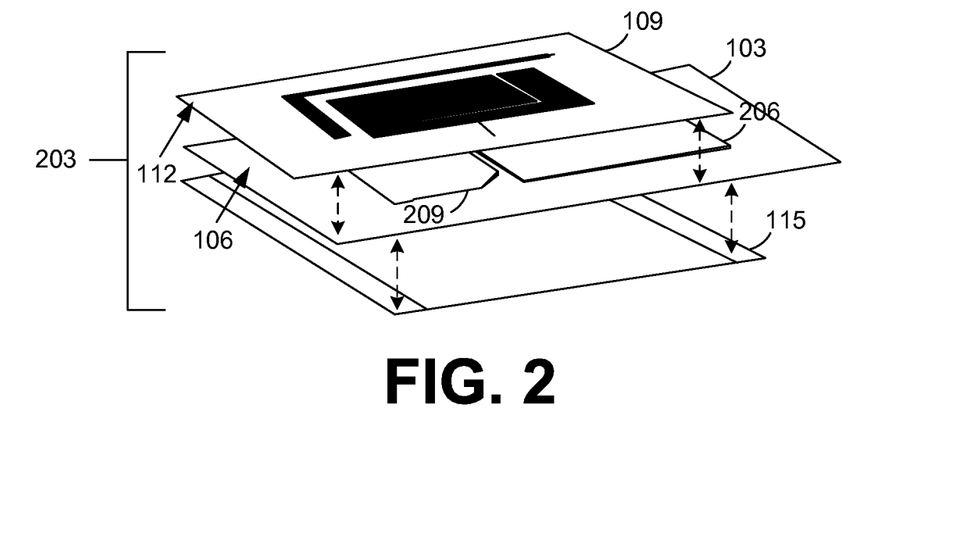
FIG. 2 is a drawing of the individual components of FIGS. 1A-B that may be combined as layered components to create a tracking device.

With reference to FIG. 2, shown are the layers of an exemplary tracking device 203 created using the components of FIGS. 1A-B. In the non-limiting example of FIG. 2, a tracking device 203 may comprise a circuit 103 printed on a substrate 106, one or more antennas 109 printed on a substrate 112, and a battery 115. In one embodiment, the circuit 103 printed on a substrate 106 may be combined with one or more localization and/or communications systems, wherein a system may comprise, for example, receivers, transmitters, transceivers, and/or other localization and/or communication circuitry. For example, the circuit 103 may be combined with receiver 206 and receiver 209 to configure the tracking device 203 to localize and/or communicate via GPS, Wi-Fi, Radiofrequency (RF), Ultrasonic, Bluetooth, Z-Wave, ZigBee, and/or any other localization and/or communication technology. In certain embodiments, receiver 206 and receiver 209 may represent the same physical circuitry capable of providing communication as well as localization. For instance, a receiver 206 and a receiver 209 may both comprise a Wi-Fi transceiver. By using paper substrates, a circuit 103 may be combined with one or more antennas 109 and a battery 115 to create a durable and lightweight tracking device 203 capable of inexpensive reproduction. The layers of the individual components of the tracking device 203 of FIG. 2 may be combined to form a uniform tracking device 203.

Figure 3:
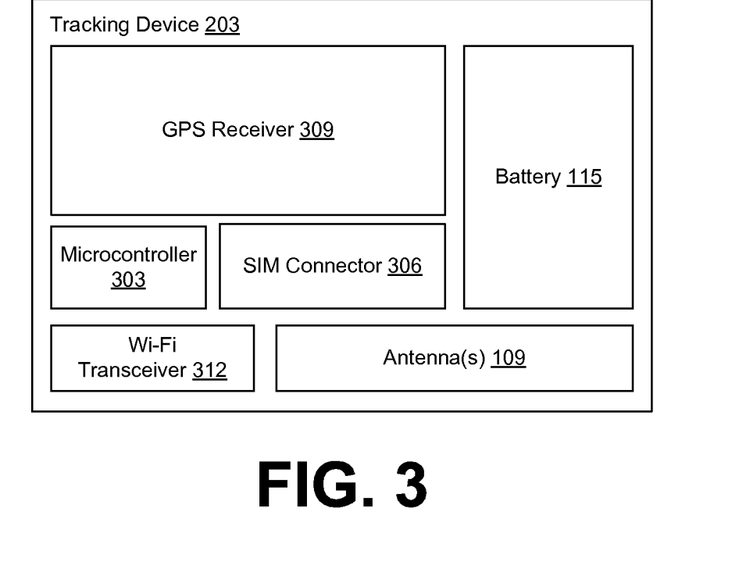
FIG. 3 is a schematic block diagram that provides one example illustration of a tracking device according to various embodiments of the present disclosure.

With reference to FIG. 3, shown is an exemplary circuit block diagram for a tracking device 203. A tracking device 203, for example, may comprise a battery 115 (or alternative power source), antennas 109, a microcontroller 303, and a Subscriber Identity Module (SIM) connector 306. As discussed above with respect to FIGS. 1 and 2, a battery 115 may include a flexible battery ensuring the tracking device 203 is capable of being bent or folded. Antennas 109 are configured to provide the tracking device 203 and its components with localization and/or communication. A SIM connector 306 is configured to facilitate the addition of portable electronics or other circuitry to the tracking device 203. As a non-limiting example, a SIM card may be used permitting a mobile communications system to identify the tracking device 203 based on the data residing within the SIM card (e.g., a unique tracking device identifier). A microcontroller 303 may be configured to coordinate among the components of the tracking device 203, as may be appreciated.

Moreover, a tracking device 203 may comprise one or more receivers/transceivers capable of localization and/or communication via one or more forms of communication. In the non-limiting example of FIG. 3, a tracking device 203 may comprise a GPS receiver 309 and Wi-Fi transceiver 312. As will be discussed in greater detail below, a Wi-Fi transceiver 312 may be to localize the tracking device 203 in the event GPS is unavailable to do so (e.g., the tracking device 203 is unable to receive a signal from a GPS system or an acquired signal fails to resolve to an acceptable fix). Although shown utilizing a Wi-Fi transceiver 312 and a GPS receiver 309, other receivers and/or transceivers may be utilized permitting the tracking device 203 to localize via alternative localization strategies using technologies such as RF, Ultrasonic, Z-wave, ZigBee, Bluetooth, and/or any other form of localization and/or communication. The tracking device 203 may thus communicate with the present tracking system across multiple, differing environments, such as indoor and outdoor environments.

Figure 4:
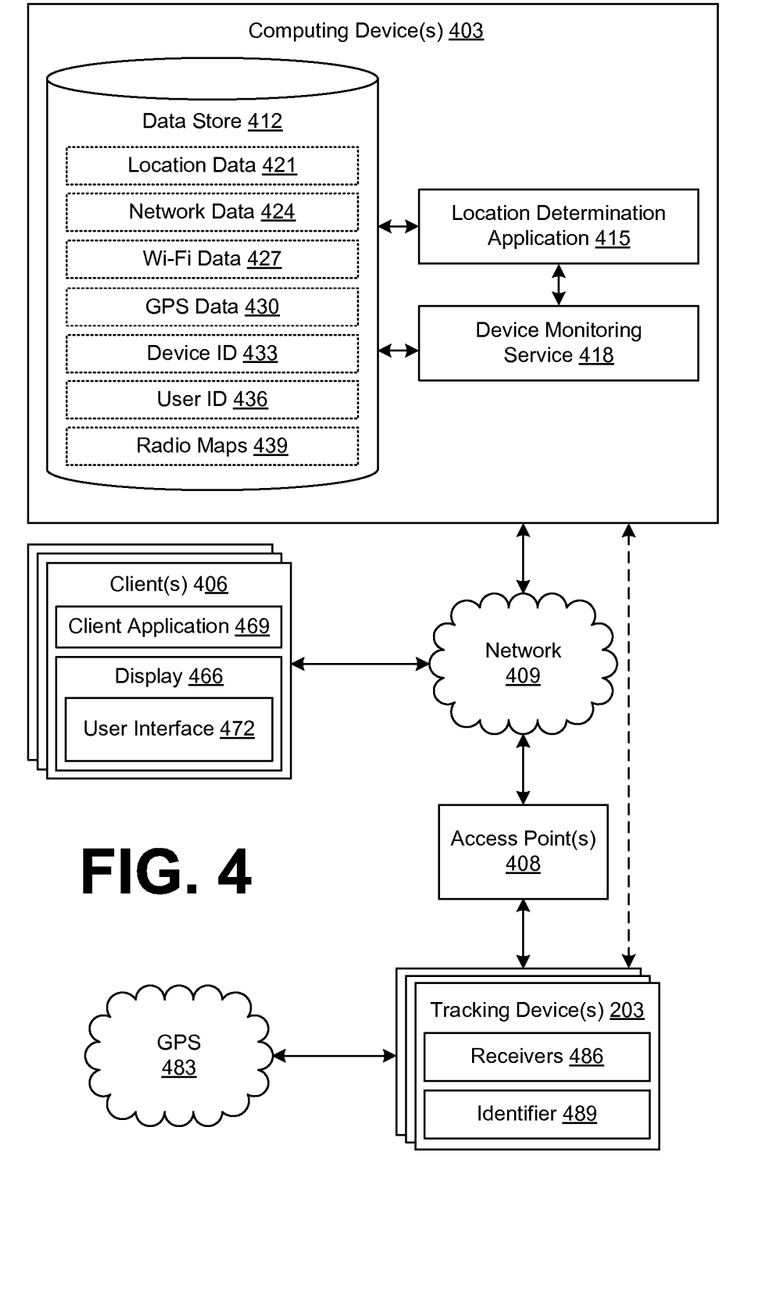
FIG. 4 is a drawing of a networked environment in communication with the tracking device of FIG. 3 according to various embodiments of the present disclosure.

With reference to FIG. 4, shown is a networked environment 400 according to various embodiments. The networked environment 400 includes a computing environment 403, a client device 406, and/or access points 408, which are in data communication with each other via a network 409. The network 409 includes, for example, the Internet, intranets, extranets, wide area networks (WANs), local area networks (LANs), wired networks, wireless networks, or other suitable networks, etc., or any combination of two or more such networks. Access points 408 may include, for example, wireless access points 408 that may be used to facilitate communication between a tracking device 203 and the network 409. Alternatively, access points 408 may comprise one or more cell sites that facilitate the communication of the tracking device 203 over one or more cellular networks. Such cellular networks may be capable of communicating, for example, via Code Division Multiple Access (CMDA), Global System for Mobile Communications (GSM), and/or any variation thereof. Utilizing a GSM network, general packet radio service (GPRS) services may be used for communication between the access points 408 and the one or more tracking devices 203. In various embodiments, a tracking device 203 may be capable of communication directly with the network 409 without access points 408 and/or computing environment 403 and/or client device 406, as may be appreciated.

The computing environment 403 may comprise, for example, a server computer or any other system providing computing capability. Alternatively, the computing environment 403 may employ a plurality of computing devices that may be employed that are arranged, for example, in one or more server banks or computer banks or other arrangements. Such computing devices may be located in a single installation or may be distributed among many different geographical locations. For example, the computing environment 403 may include a plurality of computing devices that together may comprise a cloud computing resource, a grid computing resource, and/or any other distributed computing arrangement. In some cases, the computing environment 403 may correspond to an elastic computing resource where the allotted capacity of processing, network, storage, or other computing-related resources may vary over time.

Various applications and/or other functionality may be executed in the computing environment 403 according to various embodiments. Also, various data is stored in a data store 412 that is accessible to the computing environment 403. The data store 412 may be representative of a plurality of data stores 412 as can be appreciated. The data stored in the data store 412, for example, is associated with the operation of the various applications and/or functional entities described below.

The components executed on the computing environment 403, for example, include a location determination application 415, a device monitoring service 418, and other applications, services, processes, systems, engines, or functionality not discussed in detail herein.

The location determination application 415 is executed to determine the location of one or more tracking devices 203, as will be discussed in greater detail below. For example, location data 421 may be received from one or more tracking devices 203 via any form of communication capable of providing location data 421 associated with the one or more tracking devices 203. The location of the one or more tracking devices 203 may be determined based at least in part on the location data 421 provided by the tracking device 203.

The device monitoring service 418 is executed to provide an interface thereby permitting a user to monitor one or more tracking devices 203. For example, the device monitoring service 418 may obtain location data 421 from the location determination application 415. Subsequently, the location data 421 may be transmitted by the device monitoring service 418 to one or more mapping application programming interfaces (API). In response, a digital map comprising one or more indicators (e.g., an icon) identifying the location of one or more tracking devices 203 on the digital map may be received by the device monitoring service 418. This map may be encoded in a user interface 472 (e.g., a network page, a mobile application page, etc.) and transmitted to a client 406 (FIG. 4) for rendering.

The device monitoring service 418 may be further executed to authenticate a user (i.e., requiring a user to provide a user name, password, biometric data, etc.) prior to presenting and/or transmitting information associated with the tracking devices 203. As a result, only information pertaining to tracking devices 203 associated with an account or user ID 436 may be presented to that user.

The data stored in the data store 412 includes, for example, location data 421, network data 424, Wi-Fi data 427, GPS data 430, device identifier (ID) 433, user ID 436, radio maps 439, and potentially other data. Location data 421 may comprise, for example, data obtained from one or more tracking devices 203 that may be related to and/or may be used in determining the location of the one or more tracking devices 203. Moreover, location data 421 may comprise a position database of all tracking devices 203, whether functional or non-functional. Network data 424 may be information related to frames and/or packets of information transferred over network 409. Wi-Fi data 427 may comprise information associated with utilizing wireless access points 408 to determine a location of a tracking device 203. GPS data 430 may comprise information obtained by a tracking device 203 configured to localize via GPS. A device ID 433 may be, for example, a unique identifier used to identify a tracking device 203 and/or a group of tracking devices 203. A radio map 439 may comprise, for example, an RF signature map and/or an RF signature map history. A radio map 439 may further comprise associations to points in a digital map.

The client 406 is representative of a plurality of client devices that may be coupled to the network 409. The client 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 406 may include a display 466. The display 466 may comprise, for example, one or more devices such as liquid crystal display (LCD) displays, gas plasma-based flat panel displays, organic light emitting diode (OLED) displays, LCD projectors, or other types of display devices, etc.

The client 406 may be configured to execute various applications such as a client application 469 and/or other applications. The client application 469 may be executed in a client 406, for example, to access network content served up by the computing device 403 and/or other servers, thereby rendering a user interface 472 on the display 466. To this end, the client application 469 may comprise, for example, a browser, a dedicated application, etc., and the user interface 472 may comprise a network page, an application screen, etc. The client 406 may be configured to execute applications beyond the client application 469 such as, for example, email applications, social networking applications, word processors, spreadsheets, and/or other applications.

The tracking device 203 is representative of a plurality of tracking devices 203 that may be coupled to the network 409 or may localize and/or communicate through network 409 via access points 408. Moreover, a tracking device 203 may be configured to receive signals comprising location data 421 and/or other communication data from GPS 483. The tracking device 203 may comprise, for example, the components of FIG. 2 to communicate with network 409 via Wi-Fi, Ultrasonic, Infared, RF, Bluetooth, Z-wave, ZigBee, and/or any wireless communication technology. These components may include one or more receivers 486, transceivers, transmitters, and/or other communication circuitry. Alternatively, a tracking device 203 may comprise one or more of a commercially available tracking device 203, as may be appreciated.

An access point 408 may be configured to receive communication from one or more tracking devices 203, translate the communication received into a form of communication (e.g., data packets) capable of being communicated over network 409, and transmit the communication to, for example, computing device 403 and/or client 406. Furthermore, a tracking device 203 may comprise an identifier 489 which may be communicated through network 409 in order to identify the tracking device 203, as may be appreciated. For example, an identifier 489 may be unique to a tracking device 203.

Next, a general description of the operation of the various components of the networked environment 400 is provided. To begin, the location determination application 415 may determine the location of one or more tracking devices 203. For example, location data 421 may be received from one or more tracking devices 203. Location data 421 may be obtained via GPS or any alternative form of wireless communication such as Wi-Fi. If the location data 421 was obtained through a GPS receiver, location data 421 may comprise, for example, data that may be processed in order to determine a location of the tracking device 203. Alternatively, in the event localization through GPS was unable to be established by a tracking device 203, a tracking device 203 may have obtained location data 421 from one or more wireless access points 408. The location data 421 may be transmitted by the tracking device 203 to the computing device 403 over network 409 by utilizing the access points 408, or like devices. Accordingly, the location data 421 received from the tracking device 203 may be used in the determination of a location of the tracking device 203. The location determined may be based at least in part on the location data 421 provided by the tracking device 203. In addition, other data may be used in determining the location such as radio maps 439, etc.

For example, location data 421 may have been obtained via a Wi-Fi receiver embedded in a tracking device 203. In this non-limiting example, Received Signal Strength Indicator (RSSI) methodologies may be used in determining the location of the tracking device 203 by measuring the power of a received signal, usually measured in decibels (dB) of the measured power referenced against one milliwatt (mW). Such RSSI methodologies may include RSSI triangulation and/or RSSI fingerprinting. RSSI triangulation may comprise triangulating a location of a tracking device 203 using omnidirectional access points 408 in order to determine coordinates of a transceiver embedded within the tracking device 203.

In RSSI fingerprinting, one or more radio maps 439 may be used to compare geo-reference RSSI measurements (i.e., fingerprints) from one or more access points 408, or from the tracking device 203 itself, during an "online phase". The RSSI measurements may be compared to one or more radio maps 439 to estimate a location of the tracking device 203 based at least in part on the RSSI measurements. A probability distribution function may be applied to determine the highest probability location of the tracking device 203. During an "offline phase" RSSI measurements may be used to create radio maps 439, although radio maps 439 may be manually created using alternative technology (e.g., radar, sonar, etc.).

RSSI fingerprinting traditionally observes RSSI measurements of a tracking device 203 measured against three or more access points 408. A final location may be determined by applying Gaussian mixture models, Markov models, hidden Markov models, etc. against a radio map 439 to determine one location of the tracking device 203 with the highest probability. However, three or more locations of the tracking device 203 may be observed against the three or more access points 408. The three or more locations may be fused to determine a final location utilizing, for example, a Euclidean, Rule based, GMM, Markov models, hidden Markov models, etc., classification algorithm.

Although described in an embodiment specific to Wi-Fi based access points 408, alternative technologies may be used to conduct RSSI fingerprinting. Such technologies that may utilize RSSI fingerprinting may include GSM, CDMA, Bluetooth, Z-Wave, ZigBee, RF, Ultrasonic, etc. Similarly, although described with respect to RSSI other measurements may be utilized in place of or in combination with RSSI in determining a fingerprint of a tracking device 203 such as time of arrival (TOA), angle of arrival (AOA), time difference of arrival (TDOA), uplink-time difference of arrival (U-TDOA), and/or any combination thereof.

Upon determining the location of one or more tracking devices 203, the location determination application 415 may store the location data 421, and/or the location itself, in data store 412 in association with a tracking device 203 or its identifier 489. Accordingly, the location data 421 may be used in determining the location of a tracking device 203 over time, paths traveled, places visited, length of time in a location, etc.

The device monitoring service 418 is executed to provide an interface thereby permitting a user to monitor one or more tracking devices 203. For example, the device monitoring service 418 may obtain location data 421 from the location determination application 415. Subsequently, the location data 421 may be transmitted by the device monitoring service 418 to a mapping API such as Google® Maps, Bing® Maps, Yahoo!® Maps, AOL® MapQuest, and/or any other mapping API. In response, a map comprising an indicator (e.g., an icon) identifying the location of tracking device 203 on a map may be received by the device monitoring service 418. This map may be encoded in a user interface 472 (e.g., a network page, a mobile application page, etc.) and transmitted to a client 406 (FIG. 4) for rendering. The user interface 472 may comprise additional information about the tracking devices 203 such as geocoded addresses, duration at a location, routes traveled, and/or any other information about the tracking devices 203.

The device monitoring service 418 may require authentication from a user (i.e., requiring a user to provide a user name, password, biometric data, etc.) prior to presenting and/or transmitting information associated with the tracking devices 203. Accordingly, a unique user account or user ID 436, used during authentication, may be associated with one or more tracking devices 203. As a result, only information pertaining to tracking devices 203 associated with an account or user ID 436 may be presented to that user.

Figure 5:
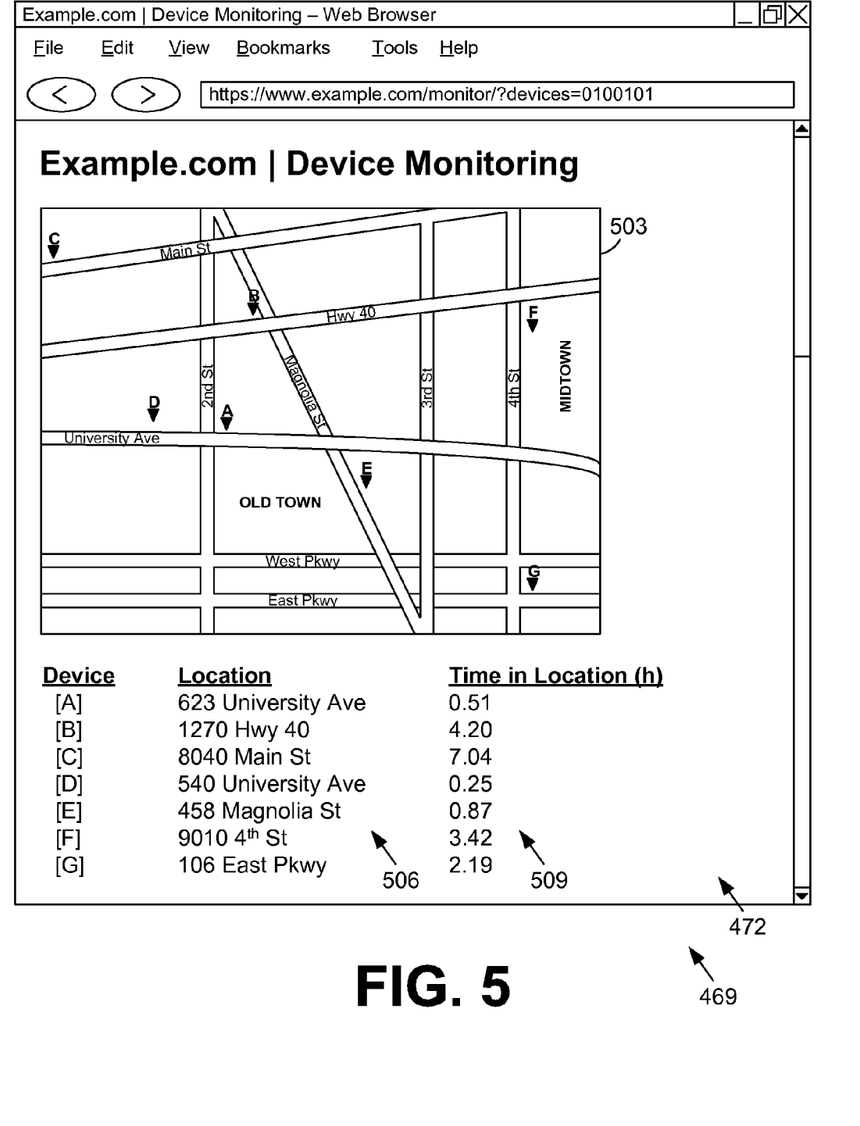
FIG. 5 is a drawing of an example of a user interface rendered by a client in the networked environment of FIG. 4 according to various embodiments of the present disclosure.

Referring next to FIG. 5, shown is an exemplary embodiment of a user interface 472 rendered in a client application 469, for example, on a client 406 (not shown). In the non-limiting example of FIG. 5, the device monitoring service 418 (FIG. 4) may render a user interface 472, embodied in FIG. 5 as a network page, comprising a digital map 503. As discussed above with respect to FIG. 4, determined locations of tracking devices 203 (not shown) may be transmitted to one or more mapping services by communicating, for example, through the mapping service's API. In return, the mapping service provides the device monitoring service 418 a digital map 503 comprising the determined locations that may be identified with an icon. The device monitoring service 418 may encode the digital map 503 in a network page to be transmitted to a client 406 for rendering. Additionally, the digital map 503 may be updated in real-time by making subsequent calls to the one or more mapping services upon a request by a user or upon the occurrence of a predefined condition. For example, the digital map 503 may be updated and/or re-rendered upon a predefined delay and/or upon noticeable movement of a tracking device 203.

Moreover, information associated with the tracking devices 203 may be encoded in the user interface 472. For example, an address 506 of each tracking device 203 may be determined utilizing geocoding or like technique. Additionally, statistics associated with the location of the tracking device 203 also may be determined and encoded in the network page. For example, a time in a location metric 509 may be encoded in the network page to show a length of time a tracking device 203 has remained in a particular position or range of positions.

As may be appreciated, the device monitoring service 418 may require authentication (i.e., requiring a user to provide a user name, password, biometric data, etc.) before presenting and/or transmitting information associated with the tracking devices 203. Accordingly, a user account or user ID 436 (FIG. 4), used during authentication, may be associated with one or more tracking devices 203. As a result, only information pertaining to tracking devices 203 associated with an account or user ID 436 may be presented.

Figure 6:
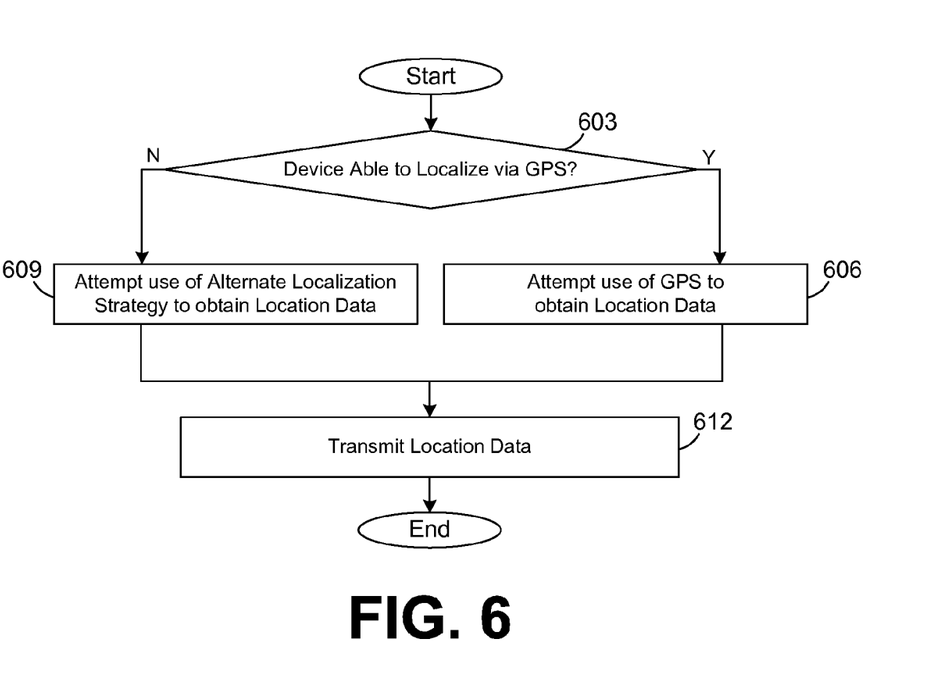
FIG. 6 is a flowchart illustrating one example of functionality implemented as portions of the tracking device executed in a computing environment in the networked environment of FIG. 4 according to various embodiments of the present disclosure.

Turning now to FIG. 6, shown is a flowchart that provides one example of the operation of a portion of the tracking device 203 according to various embodiments. It is understood that the flowchart of FIG. 6 provides merely an example of the many different types of functional arrangements that may be employed to implement the operation of the tracking device 203 as described herein. As an alternative, the flowchart of FIG. 6 may be viewed as depicting an example of steps of a method implemented in the computing environment 403 (FIG. 4) according to one or more embodiments.

Beginning with box 603, a determination is made whether the tracking device 203 is able to localize via GPS. For example, a GPS receiver embedded in the tracking device 203 may attempt to receive one or more signals from one or more satellites. When indoors or in congested areas or in other similar environments, GPS signals may be inhibited. Thus, the GPS receiver embedded in the tracking device 203 may be unable to receive signals from any GPS satellite. If a tracking device 203 via its GPS receiver is able to localize (e.g., obtain location data 421 via a signal) from a GPS satellite, in box 606, GPS may be used in obtaining location data 421. When using a GPS receiver, location data 421 may comprise, for example, data from the signal obtained from one or more GPS satellites as well as data used in computing a location of the tracking device 203.

Alternatively, if a tracking device 203 is unable to localize via GPS, in box 609, an alternative localization strategy may be attempted to obtain location data. An alternative localization strategy may comprise, for example, using Wi-Fi, RF, Ultrasonic, Bluetooth, Z-Wave, ZigBee, or any other technology to localize the tracking device 203. In one embodiment, Wi-Fi may be used in order to obtain location data 421. One or more receivers may be embedded in a tracking device 203 capable of communicating via one or more of these technologies, as may be appreciated. For example, a Wi-Fi receiver embedded on the tracking device 203 may attempt communication with one or more Wi-Fi wireless access points 408. As may be appreciated, other receivers may be embedded in the event a GPS signal or Wi-Fi signal is unable to be obtained and/or communication established.

By localizing via Wi-Fi (or any alternative form of localization) in the event GPS is unavailable, a tracking device 203 may be capable of a seamless transition for outdoor to indoor tracking and vice versa. Ultimately, in box 612, the location data 421 obtained via GPS (box 606) or the alternative localization strategy (box 609) may be transmitted to, for example, a computing device 403 (FIG. 4). The location data 421 may be processed in the computing device 403 to determine a location of the tracking device 203, as will be discussed in greater detail below.

Figure 7:
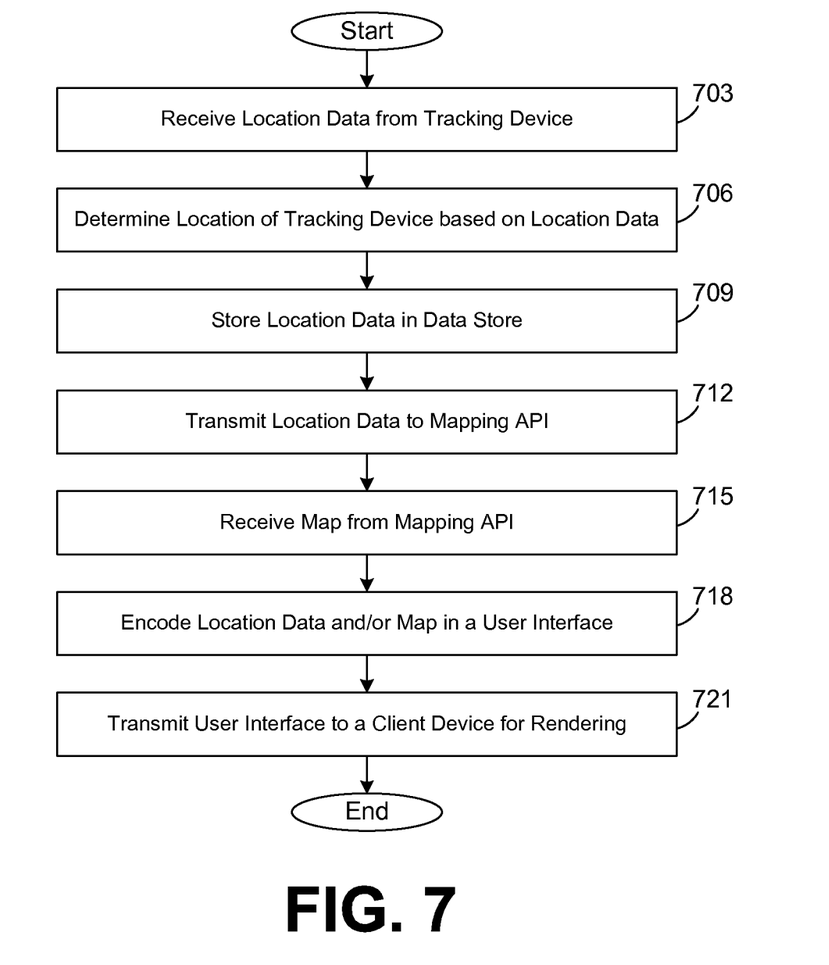
FIG. 7 is a flowchart illustrating one example of functionality implemented as portions of a location determination application and/or a device monitoring service executed in a computing environment in the networked environment of FIG. 4 according to various embodiments of the present disclosure.

Moving on to FIG. 7, shown is a flowchart that provides one example of the operation of a portion of the location determination application 415 and/or the device monitoring service 418 according to various embodiments. It is understood that the flowchart of FIG. 7 provides merely an example of the many different types of functional arrangements that may be employed to implement the operation of the portion of the location determination application 415 and/or the device monitoring service 418 as described herein. As an alternative, the flowchart of FIG. 7 may be viewed as depicting an example of steps of a method implemented in the computing environment 400 (FIG. 4) according to one or more embodiments.

Beginning with box 703, location data 421 may be received from one or more tracking devices 203. As discussed above with respect to FIG. 6, location data 421 may be obtained via GPS or any alternative form of localization. If the location data 421 was obtained through a GPS receiver, location data 421 may comprise, for example, data that may be processed in order to determine a location of the tracking device 203. Alternatively, in the event localization through GPS was unable to be established by a tracking device 203, a tracking device 203 may have obtained location data 421 from one or more wireless access points. The location data 421 may be transmitted by the tracking device 203 to a computing device 403 (FIG. 4) over network 409 (FIG. 4) by utilizing the wireless access points 408, or like devices.

In box 706, the location data 421 received from the tracking device 203 may be used in the determination of a location of the tracking device 203. The location determined may be based at least in part on the location data 421 provided by the tracking device 203. In addition, other data may be used in determining the location such as radio maps 439 (FIG. 4), etc.

For example, location data 421 may have been obtained via a Wi-Fi receiver embedded in a tracking device 203. In one embodiment, Received Signal Strength Indicator (RSSI) methodologies may be used in determining the location of the tracking device 203 by measuring the power of a received signal. The RSSI methodologies may include RSSI triangulation and/or RSSI fingerprinting. As discussed above with respect to FIG. 4, three or more locations of the tracking device 203 may be observed against three or more access points 408. The three or more locations may be fused to determine a final location utilizing GMM, Morkov models, etc. rather than the traditional RSSI fingerprinting approach.

Next, in box 709, the location data 421, and/or the location itself, may be stored in data store 412 (FIG. 4) in association with a tracking device 203 or its identifier 489 (FIG. 4). Accordingly, the location data 421 may be used in determining the location of a tracking device 203 over time, paths traveled, places visited, etc.

In box 712, the location data 421 may be transmitted to a mapping API such as Google® Maps, Bing® Maps, Yahoo!® Maps, AOL® MapQuest, and/or any other mapping API. As may be appreciated, the location determined in box 706 of a tracking device 203 (or many locations of many tracking devices 203), may be transmitted to the mapping API. In response, a map such as a digital map comprising an indicator (e.g., an icon) identifying the location of tracking device 203 on a map may be received, in box 715. In box 718, this map may be encoded in a user interface (e.g., a network page, a mobile application page, etc.). Finally, in box 721, the user interface 472 may be transmitted to a client 406 (FIG. 4) for rendering.

Figure 8:
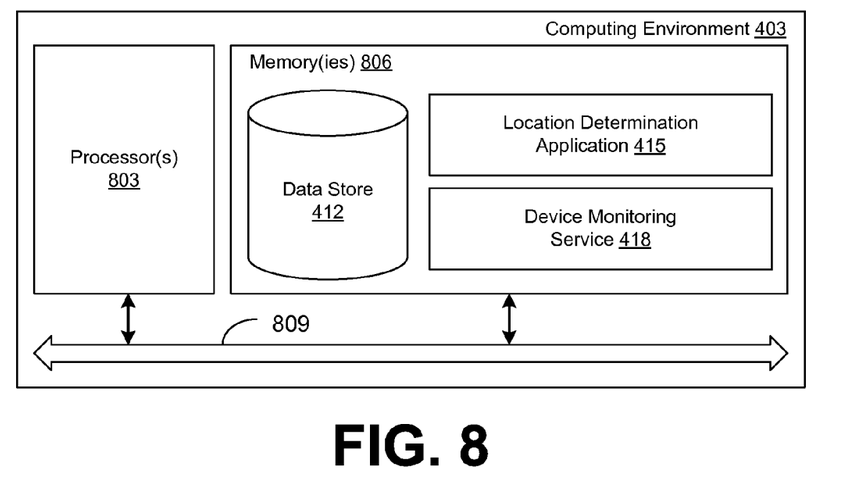
FIG. 8 is a schematic block diagram that provides one example illustration of a computing environment employed in the networked environment of FIG. 4 according to various embodiments of the present disclosure.

With reference to FIG. 8, shown is a schematic block diagram of the computing environment 403 according to an embodiment of the present disclosure. The computing environment 403 includes one or more computing devices 403. Each computing device 403 includes at least one processor circuit, for example, having a processor 803 and a memory 806, both of which are coupled to a local interface 809. To this end, each computing device 403 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are a location determination application 415, a device monitoring service 418, and potentially other applications. Also stored in the memory 806 may be a data store 412 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the location determination application 415, the device monitoring service 418, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6 and 7 show the functionality and operation of an implementation of portions of the tracking device 203, the location determination application 415, and the device monitoring service 418. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the location determination application 415 and the device monitoring service 418, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one server computing device in communication with at least one tracking device, the at least one tracking device comprising a plurality of layers combined to form the at least one tracking device, the plurality of layers comprising at least:
   a first layer comprising a localization system and a communication system, the localization system being configured to obtain location data to localize the at least one tracking device via a global positioning system (GPS), the communication system being configured to obtain the location data to localize the at least one tracking device via an alternative localization strategy responsive to the localization system being unable to obtain the location data via GPS;

a second layer comprising an antenna, the localization system or the communication system being configured to communicate via the antenna; and a third layer comprising a power source configured to provide power to the localization system and the communication system; and at least one application executable in the at least one server computing device, the at least one application comprising:

logic that determines a location of the at least one tracking device based at least in part on the location data;

logic that encodes the location of the at least one tracking device in a user interface; and logic that transmits the user interface to a client device for rendering in a display.

2. The system of claim 1, wherein one of Wi-Fi, Bluetooth, Radiofrequency (RF), Ultrasonic, Z-Wave, or ZigBee is used as the alternative localization strategy to obtain the location data.

3. The system of claim 1, wherein the location data is measured via received signal strength indication (RSSI), time of arrival (TOA), Angle of Arrival (AOA), time difference of arrival (TDOA), or up-link time difference of arrival (U-TDOA).

4. The system of claim 1, wherein the antenna is printed on a paper substrate using conductive ink, the printed antenna comprising an L-shaped absence in a rectangular monopole structure.

5. A system, comprising:

at least one computing device in communication with a tracking device, the tracking device comprising a localization system and a communication system, the localization system configured to obtain location data to localize the tracking device via a global positioning system (GPS), the communication system configured to obtain the location data to localize the tracking device via an alternative localization strategy responsive to the localization system being unable to obtain the location data via GPS, the localization system and the communication system configured to communicate via an antenna; and an application executable in the at least one computing device, the application comprising:

logic that determines a location of the tracking device based at least in part on the location data;

logic that encodes the location of the tracking device in a user interface;

logic that transmits the user to a client device for rendering;

logic that communicates with a mapping application programming interface (API) to generate a map comprising the location of the tracking device; and logic that encodes the map comprising the location of the tracking device in the user interface.

6. A system, comprising:

at least one computing device in communication with a tracking device, the tracking device comprising a localization system and a communication system, the localization system configured to obtain location data to localize the tracking device via a global positioning system (GPS), the communication system configured to obtain the location data to localize the tracking device via an alternative localization strategy responsive to the localization system being unable to obtain the location data via GPS, the localization system and the communication system configured to communicate via an antenna; and an application executable in the at least one computing device, logic that determines a location of the tracking device based at least in part on the location data;

logic that encodes the location of the tracking device in a user interface;

logic that transmits the user to a client device for rendering;

the application comprising logic that transmits the location data to the client device to be rendered in a mapping application on the client device.

7. The system of claim 1, wherein the logic that determines the location of the at least one tracking device based at least in part on the location data further comprises:

logic that determines at least three estimated locations of the at least one tracking device against at least three access points; and logic that determines a final location of the at least one tracking device based at least in part on the three estimated locations.

8. The system of claim 1, wherein at least one of the plurality of layers of the at least one tracking device further comprises at least a portion of a circuit printed on the at least one of the plurality of layers using nanoparticle ink.

9. The system of claim 1, wherein a substrate of at least one of the plurality of layers is paper.

10. The system of claim 1, wherein a substrate of at least one of the plurality of layers is plastic.

11. A method, comprising:

receiving, by at least one server computing device, location data from a tracking device, the tracking device comprising a plurality of layers combined to form the tracking device, wherein the plurality of layers comprise:

a localization system and a communication system, the localization system being configured to obtain the location data to localize the tracking device via a global positioning system (GPS), the communication system being configured to obtain the location data via an alternative localization strategy responsive the localization system being unable obtain the location data via GPS; and an antenna, the localization system or the communication system being configured to communicate via the antenna; and determining, by the at least one server computing device, a location of the tracking device based at least in part on the location data;

rendering, by the at least one server computing device, the location of the tracking device in a user interface; and transmitting, by the at least one server computing device, the user interface to a client device for rendering in a display.

12. The method of claim 11, wherein one of Wi-Fi, Bluetooth, Radiofrequency (RF), Ultrasonic, Z-wave, or ZigBee is used as the alternative localization strategy to obtain the location data.

13. The method of claim 11, wherein the location data is measured via received signal strength indication (RSSI), time of arrival (TOA), Angle of Arrival (AOA), time difference of arrival (TDOA), or up-link time difference of arrival (U-TDOA).

14. The method of claim 11, wherein the antenna is printed on a paper substrate using conductive ink, the printed antenna comprising an L-shaped absence in a rectangular monopole structure.

15. The method of claim 11, further comprising:
communicating, by the at least one server computing device, with a mapping application programming interface (API) to generate a map comprising the location of the tracking device; and
encoding, by the at least one server computing device, the map comprising the location of the tracking device in the user interface.

16. The method of claim 11, further comprising transmitting, by the at least one server computing device, the location data to the client device to be rendered in a mapping application on the client device.

17. The method of claim 11, wherein determining, by the at least one server computing device, the location of the tracking device based at least in part on the location data further comprises:
determining, by the at least one server computing device, at least three estimated locations of the tracking device against at least three access points; and
determining, by the at least one server computing device, a final location of the tracking device based at least in part on the three estimated locations.

18. The method of claim 11, wherein at least one of the plurality of layers of the tracking device further comprises at least a portion of a circuit printed on the at least one of the plurality of layers using nanoparticle ink.

19. The method of claim 11, wherein a substrate of at least one of the plurality of layers is paper.

20. The method of claim 11, wherein a substrate of at least one of the plurality of layers is plastic.

21. The system of claim 1, the at least one application further comprising:
logic that communicates with a mapping application programming interface (API) to generate a map comprising the location of the at least one tracking device; and
logic that encodes the map comprising the location of the at least one tracking device in the user interface.

22. The system of claim 1, the at least one application further comprising logic that transmits the location data to the client device to be rendered in a mapping application on the client device.

* * * * *